United States Patent [19]

Boucherie

[11] Patent Number: 4,854,645
[45] Date of Patent: Aug. 8, 1989

[54] BRUSH MANUFACTURING MACHINE
[75] Inventor: Leonel Boucherie, Roeselare-Rumbeke, Belgium
[73] Assignee: Firma G. B. Boucherie, naamloze vennootschap, Izegem, Belgium
[21] Appl. No.: 163,837
[22] Filed: Mar. 3, 1988
[30] Foreign Application Priority Data Mar. 13, 1987 [BE] Belgium .................. 8700252

[51] Int. Cl.⁴ .................................. A46D 3/00
[52] U.S. Cl. .................................. 300/10; 29/38 C; 29/563; 269/57; 269/61; 409/221
[58] Field of Search .................. 269/56-62; 300/2, 10, 11; 29/38 C, 563, 33 J; 409/221; 74/813 R

[56] References Cited

U.S. PATENT DOCUMENTS 2,433,192 12/1947 Baumgartner .................. 300/10
2,857,622 10/1958 Cleverly .................. 269/57 X
4,218,096 8/1980 Boucherie .................. 300/10 X

FOREIGN PATENT DOCUMENTS 506984 11/1951 Belgium .
1632361 12/1970 Fed. Rep. of Germany .
2826357 1/1980 Fed. Rep. of Germany .
3216345 11/1983 Fed. Rep. of Germany ........ 269/57
1397058 6/1975 United Kingdom .

Primary Examiner—Mark Rosenbaum
Attorney, Agent, or Firm—Foley & Lardner, Schwartz, Jeffery, Schwaab, Mack, Blumenthal & Evans

[57] ABSTRACT

Brush-manufacturing machine of the type equipped with a drum (1) for the transportation of the brush bodies (2) along the various processing stations, having the characteristic that the drum (1) is equipped with brush body holders (12-13-14-15) which at least at their clamping sides facing the brush bodies (2) can be revolved and/or removed from their respective sides with which they work in concert with the drum (1).

17 Claims, 2 Drawing Sheets

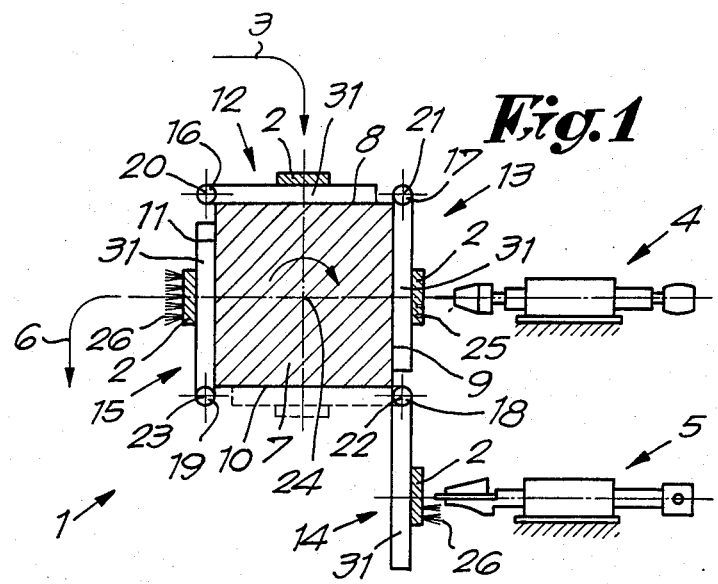
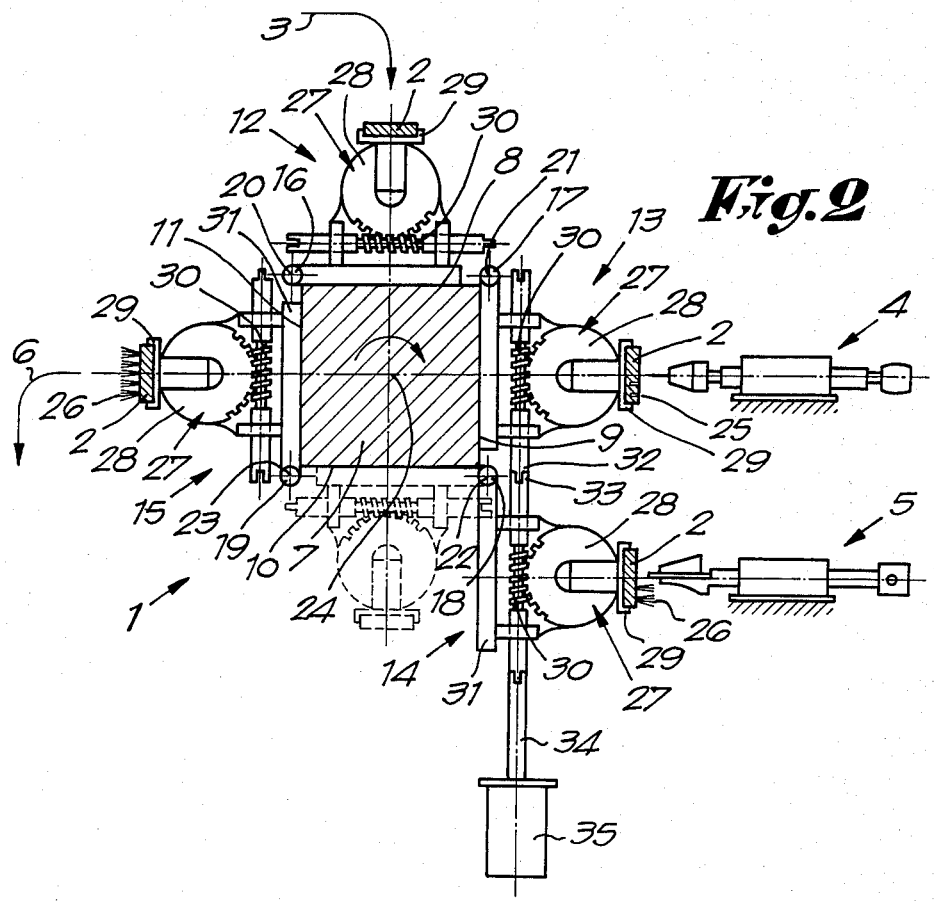

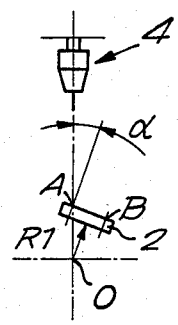
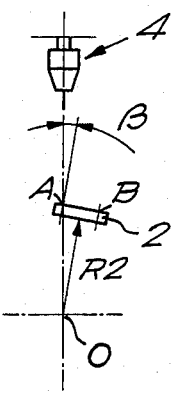
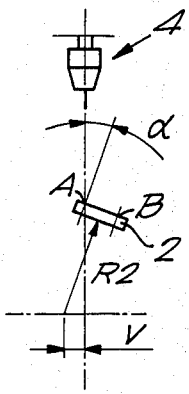
Fig.3  Fig.4  Fig.5
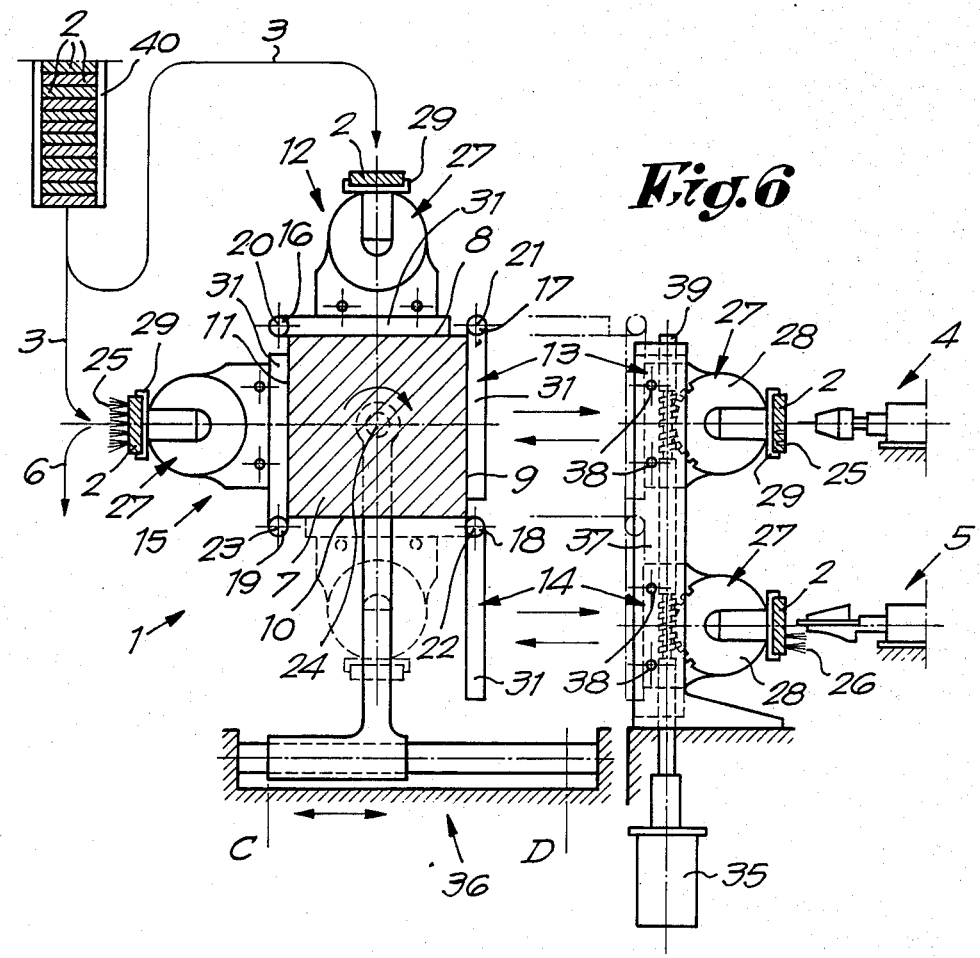
Fig.6

BRUSH MANUFACTURING MACHINE

This invention concerns a brush-manufacturing machine, more particularly of the type whereby the brush bodies to be processed are transported to the respective processing stations via a drum.

It is generally known that brushes are manufactured by providing brush bodies with perforations and subsequently planting bundles of fibres in these perforations. During this processing the brush bodies must of course be clamped. Consequently automatic brush-manufacturing machines exist whereby the brush bodies are successively inserted in different brush-body holders in order to execute the respective processing operations, e.g. loading of new brush bodies, perforating, filling, cutting, cleaning, etc. It is obvious that repeated removal of the brush bodies from the brush body holder and subsequently replacing them in another brush body holder is a time-consuming operation. As a result thereof it is moreover impossible to guarantee a perfect positioning of e.g. the perforated brush body before the filling device, after the transfer, so that the possibility arises that bundles of fibres are not placed perfectly in the middle of the previously perforated holes.

This has lead to the development of machines in which a drum is used around the circumference whereof brush body holders are positioned so that the latter, by turning the drum, can be placed opposite the respective processing equipment positioned around the drum so that the brush body remains in the same brush body holder during perforating, filling and any other processing operations.

The presently known brush-manufacturing machines of the drum type however have the disadvantage that to each brush body holder, or, for instance in the case of a double machine, for every two brush body holders, which is, respectively are, fixed onto the drum, the necessary movements, such as translations, rotations and combinations thereof following the longitudinal and latitudinal axis of the brush holder, as well as the so-called depth compensation movement, must be provided in order to be able to position the bush bodies before the processing equipment according to the required pattern.

The result thereof is, on the one hand, that the drum has a very complicated construction and, on the other hand, this construction must be undoubled several times, i.e. at least as many times as there are processing tools positioned around the drum. An additional disadvantage is for instance that opposite certain processing equipment the brush body must not be moved so that at this moment the moving possibility at this station must be eliminated. Thus, during a large part of the cycle, the mechanism described above is not working (e.g. to load brush bodies while the machine is perforating and filling) and consequently during this period of time the mechanism is not used.

The purpose of this invention consequently is a brush-manufacturing machine which systematically excludes the above mentioned disadvantages. To this effect the invention concerns a brush-manufacturing machine, particularly of the type which for the execution of various processing operations uses a drum with brush body holders placed around its circumference having the characteristic that the brush body holders can be revolved and/or removed from their respective surfaces with which they work in concert with the drum.

The axis of rotation following which these brush body holders can be revolved from the faces of the drum is parallel with the axis of rotation of the drum. This construction makes it possible that several brush body holders, and the respective brush bodies clamped therein, are presented in the same processing field, whereby during perforating and filling only one positioning mechanism must be provided to insert the various perforations, respectively brush hairs. The positioning mechanism can also perform the movement of the drum vis-a-vis the perforating and filling equipment.

With a view to better show the characteristics of the invention, hereafter follow, as examples, having no restrictive character, some preferential applications with reference to the attached drawings, where:

FIG. 1 shows schematically the brush manufacturing machine according to the invention;

FIG. 2 shows a variant of the invention;

FIGS. 3 through 5 explain the difficulties when perforating and filling at an angle;

FIG. 6 gives another schematical variant of the invention.

The brush-manufacturing machine according to FIG. 1 mainly consists of a drum 1 onto the circumference whereof brush bodies 2 can be fitted whereby these are placed on drum 1 via a schematically indicated feed 3, then are presented under a perforating installation 4 and a filling device 5 and whereafter the manufactured brushes leave drum 1 via the schematically indicated discharge 6.

In this application drum 1 has a square section. However, there is no reason why this drum should not be triangular, polygonal, endless loop, chain or otherwise.

The particularity of the invention now is that the brush body holders can be revolved outwards from the faces of drum 1. To this effect in the application according to FIG. 1 a square drum base 7 was used which at its respective sides 8 through 11 is equipped with brush body holders 12 through 15 which at one of their sides can be revolved from sides 8 through 11 by means of hinges 16 through 19. In this application the axes of rotation 20 through 23 of the hinges are parallel with the axis of rotation of drum 1.

Further the installation is also equipped with drive gear and/or guidings in order to have brush body holders 12 through 15, as further described below, make correct hinge movements around axes of rotation 20 through 23.

As the nature of these drive gears and guidings is arbitrary and can be easily realised by an averagely schooled workman they are not shown in the figures for clearness' sake.

The working of the brush-manufacturing machine according to FIG. 1 can be seen easily from the figures. Brush bodies 2 are successively placed onto drum 1 via feed 3, are perforated after a revolving of 90 degrees, at the following revolving are filled and finally after a total revolving of 270 degrees are removed at discharge 6, at which stage the brushes are manufactured. From FIG. 1 it can be seen that the brush body holders, in the position in which they are presented to filling device 5 are brought in their outwardly hinged position. In the position according to FIG. 1 this is the brush body holder 14 which is revolved over 90 degrees. Since hinges 16 through 19 are placed on the vertex of drum base 7, the brush body holders, in this case brush body holders 13 and 14, placed before perforating installation 4 and the filling device 5 come in a same plane, having the advantage that, to insert the respective perforations 25 and bundles of fibres 26 in brush bodies 2, the brush bodies which have to be perforated and filled can be positioned opposite the perforating and filling installation by one and the same positioning installation. This positioning can then be realised by having the drum 1 make translations and rotations or a combination of both in the appropriate axes through a mechanism which is not shown.

It is clear that feed 3 and discharge 6 of brush bodies 2 can be fully automatic.

In FIG. 2 is a variant of the brush-manufacturing machine according to the invention is shown following which the bundles of fibres 26 can be planted in the brush bodies under different angles. For this purpose each hingable brush-body holder 12 through 15 is in its turn also equipped with a revolving element 27 whereby each element 27 can revolve around an axis.

Each revolving element 27 hereby mainly consists of a worm wheel or worm wheel segment 28 in which a fixed or radially adjustable brush body support 29 is equipped with the necessary clamping devices for the drills 2. The worm wheel segments 28 are coupled to worm shafts 30, the whole being mounted on a base plate 31, while the various base plates 31 are hingable respectively around the above mentioned axes of rotation 20 through 23.

The drive of the worm shafts 30 can of course be provided in different ways. Preferably the respective worm shafts 30 shall be situated in such a way that by a 90 degree revolving of a brush body holder the worm shafts 30 of two successive brush body holders engage together via the coupling ends 32 and 33 provided therefor. In the given example worm shafts 30 of brush body holders 13 and 14 are consequently coupled to each other. The worm shafts 30 are in their turn driven by means of a drive shaft 34 of a motor 35, for instance a servo motor.

Another application could be for instance that the revolving elements 27 consist of a gear wheel or a gear wheel segment which works in concert with a slot. This slot can then for instance work in concert with a servo mechanism to obtain a revolving of the segments.

A solution could consist of the placing of a sensor at the level of the perforating and filling station which selectively detects the positioning of the perforating and filling device with regard to the brush body and, dependently from this detection determines the depth movement, i.e. the distance between brush body and processing tools instead of laying it down beforehand in a program.

The depth movement in regard of the perforating and filling station must of course occur independently from each other since the brush body must first be perforated and then filled.

Or, while a brush body is perforated and filled, the next brush body to be perforated must be scanned and the information obtained from this scanning, when moving the brush body to the perforating station, must be transferred with it for the determination of the perforating depth and must subsequently again be transferred to control the depth of the perforation, i.e. the difference between the filling device and the brush body.

If necessary, the perforating movement can in certain cases always keep the same depth movement, i.e. as pre-programmed in advance since a small variation of the depth of the perforations causes less problems than for the filling.

To realise this the perforating installation and the filling installation must thus each be positioned so that they can be moved separately with regard to the brush holders before them and vice versa. In this case, for instance, the perforating and filling installations can each be mounted on a slide which are driven by servo as described above.

These servos are then driven by known drives (e.g. CNC) in order to obtain the desired perforation pattern. This perforation pattern is consequently pre-programmed, the program containing all information to position the brush bodies before the perforating and filling installation.

One of the movements thus programmed is the so-called depth compensation movement which moves the brush bodies of the processing unit (perforating and filling) from or towards the processing units.

If now there is an irregularity on the surface of the brush body to be perforated and filled, this can lead to disturbances. An irregularity means here that on said surface, for instance, there is a protuberance or a local sinking (which is very often the case with synthetic brush bodies) which has as a consequence that the perforating and/or filling equipment will be too close or too far from the brush body at those places where these irregularities occur with the consequence that a perforation is too deep or not deep enough and that a bundle of fibres will be planted too deep or badly or that this bundle will already be disintegrated before it is placed in the perforated hole because for instance the filling device, in the case of a local sinking, is situated too far from the brush body to form a proper transfer when placing the bundle of fibres in the perforation, so that the bundle drops between the filling device and the brush body or misses the perforation.

This is fully the result of the pre-programmed depth compensation which was programmed on one particular brush body and certainly could not foresee any irregularities in the surface as described above.

The working of the installation can be seen from the figure and mainly consists in the placing of brush bodies 2 in the brush body support 29 via feed 3, whereafter by revolving the drum 1 these are respectively positioned before perforating installation 4 and filling device 5. The worm shafts 30 of the brush body holders 13 and 14 which are in front of this equipment here fit into each other and are driven by for instance a servo motor 35. By transmission between the worm shafts 30 and worm wheel segment 28 the brush bodies 2 can be presented simultaneously under different angles. The discharge 6 of brush bodies 2 occurs as described above. In this case also drum 1 shall be positioned in such a way that it can execute translation, rotation and/or combined movements with regard to the equipment positioned around it, to which effect the necessary drives are of course provided. The latter can for instance be formed by all possible servo systems, such as DC and alternating current servo motors, stepping motors, hydraulic linear amplifiers, hydraulic torque amplifiers, so-called linear motors or linear stepping motors, ordinary alternating current motors with the necessary controls which make possible the positioning with such motors, etc.

By on the one hand the possibility to rotate elements 27 and on the other hand the possibility to have drum 1 for instance execute translation movements a very special construction is obtained, the advantages whereof will appear from the following description of FIGS. 3 through 5. Indeed, from FIGS. 3 and 4 it follows clearly that if for two brush bodies 2 one wishes to place brush hares at the same spot A but under different angles brush bodies 2 which are clamped in the brush body holders must be able to rotate on different axes R1 and R2, at least if the drill head or the filling device are in a fixed position. FIG. 5 shows that by providing a displacement V of the brush body holders the result is obtained that in any point A of brush body 2 from any angle a perforation, respectively filling can take place without having to displace turning point 0 (in other words RS<R1)

In the application according to FIG. 2 this advantage is offered by, on the one hand, the use of revolving elements 27 and, on the other hand, the translation movements of drum 1. If necessary the brush body supports 29 can in addition be radially slidable and positionable vis-a-vis worm wheel segment 28. It goes without saying that drum 1 according to the applications of FIGS. 1 and 2 makes nearly continuous movements during the brush manufacturing process, whereby these movements can consist of translations, rotations and combinations thereof according to the longitudinal and latitudinal axes of the brush bodies, for instance as shown in FIGS. 3 through 5, as well as a depth compensation movement in order to successively present brush bodies 2 with all their places where perforations 25 and bundles of fibres 26 must be inserted before the respective perforating installation 4 and the filling device 5.

Independent from the fact whether one possesses a fully automated feed 3 and discharge 6 of the brush bodies 2, respectively the manufactured brushes, inconveniences can be caused because the positioning and removal of brush bodies 2 in the brush body holders 12 through 15 is hindered since they move continuously.

Consequently in FIG. 6 a variant of the invention is given which offers a solution to this problem. The brush body holders 12 through 15 here each consist of a combination of a revolving element 27 and base plates 31 which can respectively hinge around axes of rotation 20 through 23. The revolving elements 27 can be removed from the base plates 31.

Drum 1 is mounted on a slide 36 and apart from its rotation movement it can make a translation movement between the limit positions C and D. Next to drum 1, more particularly at the height of perforating installation 4 and filling device 5 a pillar 37 is provided which is parallel with, on the one hand, brush body holder 13 which works in concert with side 9 of drum 1 and the extended brush body holder 14. Drum 1 and pillar 37 are designed in such a way that by bringing slide 36 in position D the revolving elements 27 can be transferred to pillar 37, whereafter slide 36 can move back to position C together with drum 1. Thus a situation as in FIG. 6 is obtained.

It should further be noted that pillar 37 is of course equipped with the necessary clamps 38 to retain the revolving elements 27. Further drives are provided, such as a worm shaft 39, to drive the revolving elements 27. Pillar 37 itself now executes the movements which, as described above, are normally executed by drum 1 in order to properly bring brush bodies 2 in front of the perforating installation 4 and filling device 5. Drives to move and position elements are known as such and are not handled further here. It should however be noted that it is not necessary to provide a separate worm shaft 39 in pillar 37 but that it is also possible to use worm shafts 30 as in the application of FIG. 2, whereby these are mounted on base plates 31 together with revolving elements 37 and whereby, while integrated in pillar 37, they can naturally work in concert at their ends.

The working of the installation can easily be seen from FIG. 6. Here at the place where brush body holder 12 is shown the feed 3 of a brush body 2 is provided. However, feed 3 can, according to the variant, also take place where brush body holder 15 is shown. Subsequently drum 1 is revolved 90 degrees bringing slide 36 in position D. In this way revolving element 27, into which brush body 2 was clamped between pillar 37, whereby it is attached onto pillar 37 by means of clamps 38 and is automatically removed from the appropriate base plate 31. While on pillar 37 the perforating of the appropriate brush body 2 takes place slide 36 is moved back to position C so that on the immobile drum 1 on the upper side again a feed of new brush bodies 2 can be provided from reserve 40. Then slide 36 is brought back to position D whereby revolving element 27 which is positioned opposite perforating installation 4 is again coupled to the appropriate base plate 31. Slide 36 then moves slightly to the left, in other words away from pillar 37, whereafter the drum 1 again rotates 90 degrees, the brush body holder which clamps brush body 2 then coming at the lower side of the drum 1 and, as shown in the figure, is hinged downward—away from drum 1. With the rotation of drum 1 also the last brush body 2 which is introduced is positioned in front of perforating installation 4. By now moving slide 36 back to the right the two revolving elements 27 which are respectively in front of the perforating installation 4 and the filling device 5 can simultaneously be positioned in pillar 27. By drawing back slide 36 to position C the loading cycle can be repeated again, while without disturbance the perforating and filling process of brush bodies 2 which are then taken up in pillar 37 can be executed.

It is clear that after one or a three quarter rotation of drum 1 the brush manufactured by the respective brush body holder, which is then positioned in the place of brush body holder 15 in the figure, is separated and is discharged in a way known in itself to for instance an automatic finishing machine, an inspection station, a packaging machine, etc.

According to a variant of the application according to FIG. 6 revolving elements 27 can be mounted fixed on pillar 37 whereby the brush body holders on the drum simply consist of brush body supports 29 with brush clamps attached thereto which clamp the brush bodies on the above mentioned base plates 31.

By presenting drum 1 to pillar 37 the result is for instance obtained that brush body supports 29 with the brush bodies clamped thereto are directly transferred from base plate 31 to the elements 27 of pillar 37. Thus, drum 1 no longer needs to be equipped with the revolving elements 27.

According to yet another variant, only the brush bodies 2 themselves can be transferred from brush body holders 29 of drum 1 to supports 29 provided on revolving elements 27 of pillar 37.

Obviously drum 1 can be equipped with more or less than four hingable brush body holders 12 through 15.

It is clear that the invention not only concerns brush body holders 12-15 which, as in the figures, are executed in the form of revolving elements, but concerns all brush body holders placed on a drum and the clamping surface whereof can be rotated in front of the brush bodies from the plane with which they work in concert with the drum.

This invention is not at all limited to the applications described as examples and shown in the figures, but such brush manufacturing machine can be realised in all sorts of forms and dimensions without falling outside the scope of the invention.

I claim:

1. A brush-manufacturing machine comprising:
   a rotatable drum for the transportation of brush bodies to different processing stations,
   a plurality of removable brush body holders attached to said drum, and
   means on said drum for revolving said brush body holders away from said drum about respective axes of rotation so that at least two of said brush body holders are simultaneously arranged opposite at least two successive processing stations.

2. The brush-manufacturing machine according to claim 1, wherein the axes of rotation about which the brush body holders are revolved away from the drum are parallel to the axis of rotation of the drum.

3. The brush-manufacturing machine according to claim 1, wherein the axes of rotation about which the brush body holders are revolved from the drum form an angle with the axis of rotation of the drum.

4. The brush-manufacturing machine according to claim 1, said means for revolving further comprising drives provided to revolve the brush bodies away from the drum, whereby around the circumference of the drum successive brush body holders can be presented in a single processing field.

5. The brush-manufacturing machine according to claim 1, wherein said drum comprise a drum base having vertices on which the brush body holders are hingedly placed.

6. The brush-manufacturing machine according to claim 1, wherein each brush body holder has a rotating brush body support which can each be revolved on an axis parallel with the axis of rotation of the drum.

7. The brush-manufacturing machine according to claim 6, wherein said brush body support form part of rotating elements in which said brush body supports can radially slide.

8. The brush-manufacturing machine according to claim 7, wherein said rotating elements comprise worm wheel segments driven by worm shafts mounted on the brush body holders whereby the worm shaft of a brush body holder revolved away from the drum works in concert with the worm shaft of an adjacent brush body holder which is situated in the same processing field.

9. The brush-manufacturing machine according to claim 8, further comprising a drive for at least the worm shaft of the brush body holders which are transported to the processing stations.

10. The brush-manufacturing machine according to claim 1, wherein the drum is equipped with drives for translation movements, rotation movements and combined movements.

11. The brush-manufacturing device according to claim 1, further comprising a pillar member for removing said brush body holders from said drum, said pillar member being arranged parallel to a single processing field, and transportation means to move the drum and the pillar member with respect to each other.

12. A brush-manufacturing machine comprising:
    a rotatable drum for the transportation of brush bodies to different processing stations;
    a plurality of brush body holders attached to said drum;
    means on said drum for revolving said brush body holders away from the surface of said drum; and
    each of said brush body holders having a rotating brush body support revolvable about an axis parallel to the axis of rotation of said rotatable drum.

13. The brush-manufacturing machine according to claim 12, wherein said brush body supports form part of rotating elements in which said brush body support can radially slide.

14. The brush-manufacturing machine according to claim 13, wherein said rotating elements comprise worm wheel segments driven by worm shafts mounted on the brush body holders whereby the worm shaft of a brush body holder revolved away from the drum works in concert with the worm shaft of an adjacent brush body holder which is situated in the same processing field.

15. The brush-manufacturing machine according to claim 14, further comprising a drive for at least the worm shaft of the brush body holders which are transported to the processing stations.

16. The brush-manufacturing machine according to claim 12, wherein said brush body holders are removable.

17. The brush-manufacturing machine according to claim 16, further comprising a pillar member for removing said brush body holders from said drum, said pillar member being arranged parallel to a single processing field, and transportation means to move the drum and the pillar member with respect to each other.

* * * * *